United States Patent [19]
Rudisill et al.

[11] Patent Number: 5,928,000
[45] Date of Patent: Jul. 27, 1999

[54] AXIALLY-COMPLIANT COAXIAL CONNECTORS AND RADIOTELEPHONES INCLUDING THE SAME

[75] Inventors: Charles Rudisill, Apex; Russell Evans Winstead, Raleigh, both of N.C.

[73] Assignee: Ericsson Inc., Research Triangle Park, N.C.

[21] Appl. No.: 09/168,030

[22] Filed: Oct. 7, 1998

[51] Int. Cl.⁶ .................................................. H01R 9/09
[52] U.S. Cl. .............................................. 439/63; 439/700
[58] Field of Search .......................... 439/63, 581, 700, 439/824, 482, 289

[56] References Cited

U.S. PATENT DOCUMENTS

| | | | |
|---|---|---|---|
| 431,412 | 7/1890 | Studte | 439/700 |
| 5,380,211 | 1/1995 | Kawaguchi et al. | 439/74 |
| 5,525,076 | 6/1996 | Down | 439/585 |

FOREIGN PATENT DOCUMENTS

2917111  11/1980  Germany ................. 439/63

*Primary Examiner*—Neil Abrams
*Assistant Examiner*—Michael C. Zarroli
*Attorney, Agent, or Firm*—Myers Bigel Sibley & Sajovec, P.A.

[57] ABSTRACT

An axially compliant coaxial connector includes a conductive cylindrical sleeve having a helical slot formed therein, an electrical insulator having a central bore disposed within the sleeve, and a conductive pin having a helical slot formed therein disposed within the electrical insulator central bore. The sleeve and pin are configured to be elastically deflected when a compressive force is applied along an axial direction.

36 Claims, 5 Drawing Sheets

AXIALLY-COMPLIANT COAXIAL CONNECTORS AND RADIOTELEPHONES INCLUDING THE SAME

FIELD OF THE INVENTION

The present invention relates generally to electrical connectors and, more particularly, to coaxial electrical connectors.

BACKGROUND OF THE INVENTION

Electronic devices, such as handheld radiotelephones (e.g., cellular telephones), may have one or more parts that are configured to translate or rotate with respect to one another. For example, a flip cover may be pivotally mounted to the body of a radiotelephone so as to be movable between closed and open positions. A flip cover may contain a microphone, antenna or other electronic component that is electrically connected with an electronic component contained within the body of a radiotelephone.

Electro-mechanical devices, such as coaxial connectors, flex cables and wires, are conventionally utilized to electrically connect electronic components located within portions of a radiotelephone that rotate with respect to each other. For example, an antenna contained within a flip cover may be electrically connected to a transceiver located within the body of a radiotelephone via a coaxial connector that allows the flip cover to rotate with respect to the body while maintaining an electrical connection between the antenna and transceiver.

Unfortunately, neither conventional coaxial connectors nor flex cables facilitate quick and easy disconnection so that a flip cover or other portion of a radiotelephone can be separated from a radiotelephone housing without requiring manual separation of an electromechanical connection. Conventional coaxial connectors and flex cables generally utilize a "plug-in" configuration that requires axial separation from a receiving connector. As a result, when a radiotelephone is dropped or otherwise overstressed, conventional coaxial connectors and flex cables can cause a flip cover to remain attached to the radiotelephone, and thus sustain damage. It would be desirable to allow flip covers to separate from the body of a radiotelephone when the radiotelephone is dropped or subjected to various impacts or abuse to reduce the potential for damage.

In addition, flex cables can sustain damage or "fatigue" from cyclic flexing. Over time, the repetitive opening and closing of a flip cover can cause a flex cable to fail due to fatigue limitations of the materials.

Telecommunications devices, such as radiotelephones, have become increasingly popular for both personal and commercial use. However, with their increase in popularity, radiotelephones have also been undergoing miniaturization to facilitate storage and portability. Indeed, some contemporary radiotelephone models are only 11–12 centimeters in length. Unfortunately, as radiotelephones become smaller, available space for conventional coaxial connectors and flex cables has become limited.

SUMMARY OF THE INVENTION

In view of the above, it is therefore an object of the present invention to provide electrical connectors that can facilitate quick and easy disconnection of flip covers and other appendages that are mounted and electrically connected to an electronic device such as a radiotelephone.

It is another object of the present invention to provide electrical connectors that can allow flip covers and other appendages to separate from an electronic device, such as a radiotelephone, with reduced potential for damage when the electronic device is dropped, abused, or subjected to impact forces.

These and other objects of the present invention are provided by an axially compliant coaxial connector including a conductive cylindrical sleeve having a helical slot formed therein, an electrical insulator having a central bore disposed within the sleeve, and a conductive pin having a helical slot formed therein that is disposed within the electrical insulator central bore. The sleeve extends along an axial direction and terminates at opposite first and second annular ends. The sleeve includes a circumscribing, helical slot (or a series of overlapping cross-cut slots which are cut past the centerline of the sleeve) formed therein that allows the first and second annular ends to be elastically deflected towards each other when a compressive force is applied to the sleeve along the axial direction.

The electrical insulator is preferably secured to the sleeve so that movement of the electrical insulator along the axial direction is restrained. The central bore of the electrical insulator extends along the axial direction and electrically insulates the pin from the sleeve.

The pin terminates at opposite first and second ends, and the first end is substantially coextensive with the first annular end of the sleeve. An elongated central bore is formed in the pin along the axial direction and terminates at an aperture in the pin second end. A circumscribing, helical slot (or a series of overlapping cross-cut slots which are cut past the centerline of the pin) is formed in the pin and allows the first and second ends of the pin to be elastically deflected towards each other when a compressive force is applied to the pin along the axial direction.

A receptacle that is configured to receive the sleeve first annular end and the pin first end can be mounted within either the radiotelephone housing or flip cover. The receptacle includes an annular first contact configured to receive the sleeve first annular end in mating engagement. The annular first contact allows the coaxial connector to rotate about the axial direction while in mating engagement with the sleeve first annular end. The receptacle also includes a second contact configured to receive the pin first end in mating engagement and to allow the coaxial connector to rotate about the axial direction while in mating engagement with the pin first end.

Axially compliant coaxial connectors according to the present invention can be used to electrically connect flip covers and other appendages rotatably mounted to electronic devices, such as radiotelephones. The present invention is particularly advantageous when used in applications where it is desirable for an appendage to an electronic device to quickly and easily separate from the electronic device.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
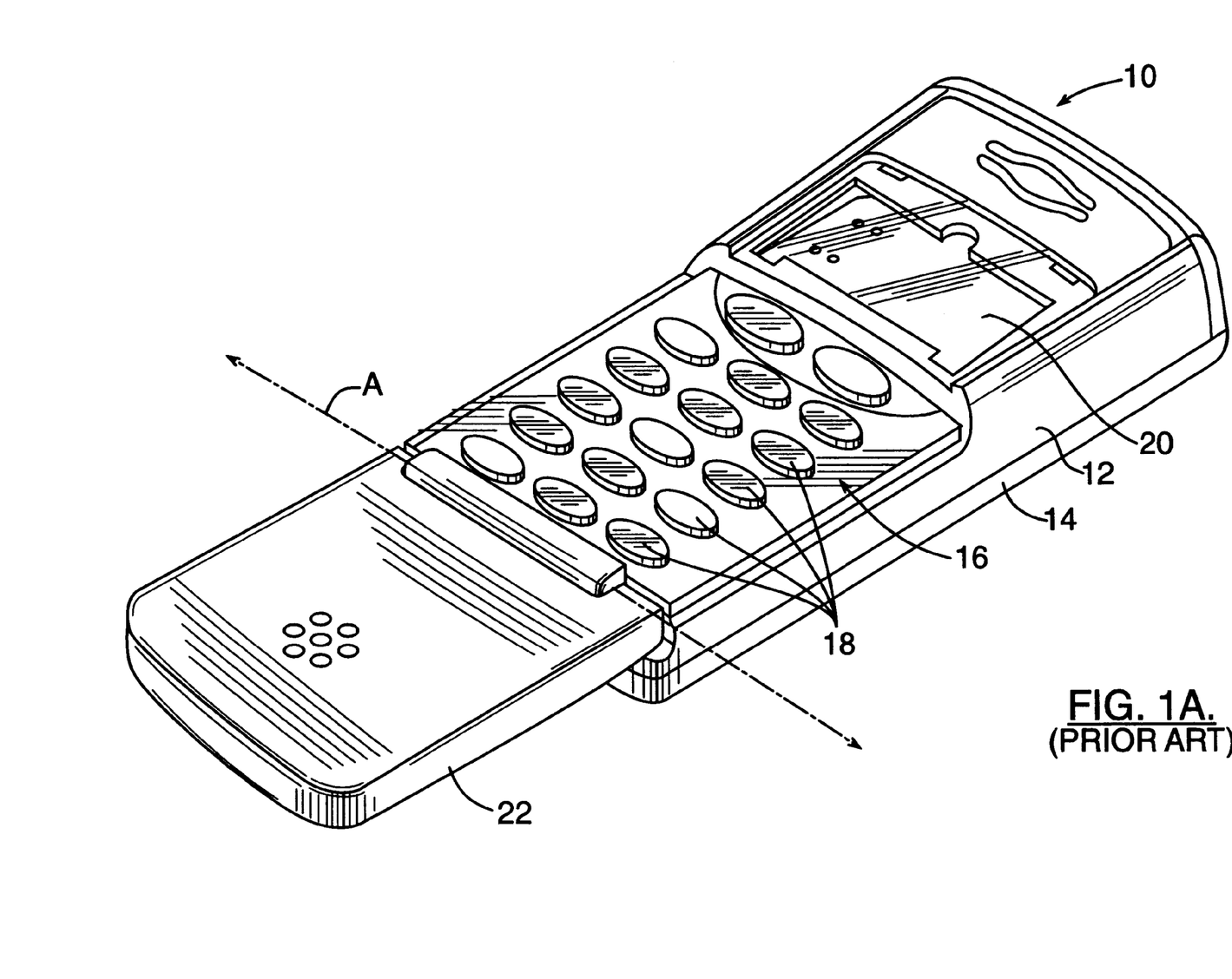
FIG. 1A illustrates an exemplary "flip phone" style radiotelephone within which an electrical connection apparatus according to the present invention may be incorporated, and wherein the flip cover is in an open position.
Figure 1B:
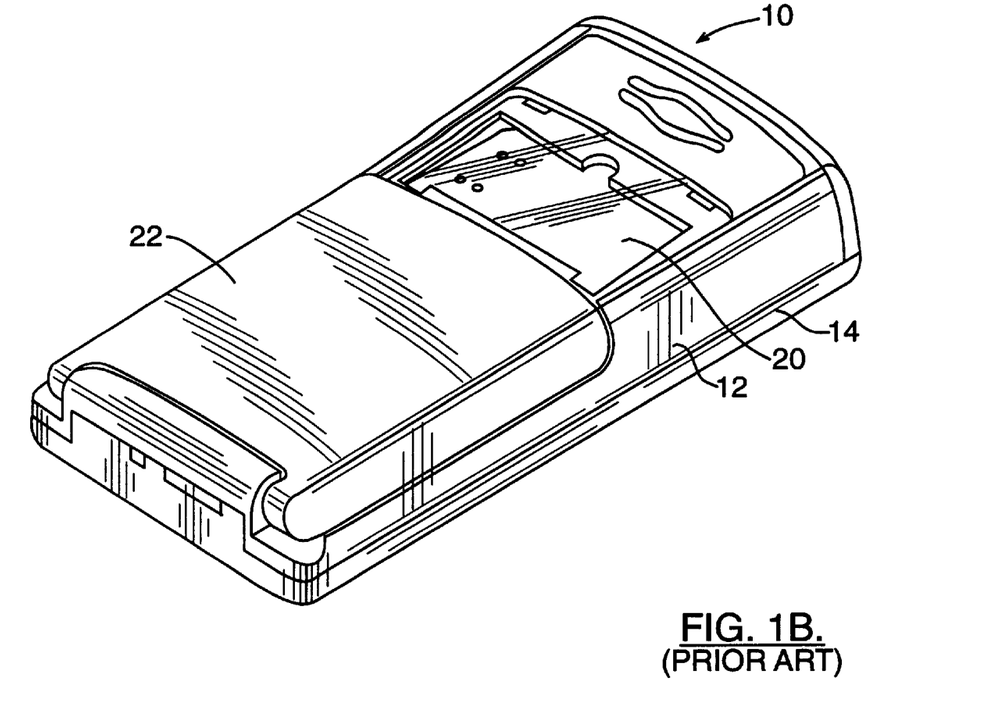
FIG. 1B illustrates the radiotelephone of FIG. 1A with the flip cover is in a closed position.

Referring now to FIGS. 1A and 1B, a "flip phone" style radiotelephone 10 in which the present invention may be incorporated is illustrated. The illustrated radiotelephone 10 includes a top handset housing 12 and a bottom handset housing 14 connected thereto to form a cavity therein. Top and bottom handset housings 12 and 14 house a keypad 16 including a plurality of keys 18, a display 20, and electronic components (not shown) that enable the radiotelephone 10 to transmit and receive telecommunications signals. A flip cover 22 is hinged to one end of the top housing 12, as illustrated.

In operation, the flip cover 22 may be pivoted by a user about an axis A between an open position (FIG. 1A) and a closed position (FIG. 1B). When in a closed position, the flip cover 22 may provide protection to the keypad 16 mounted within the top handset housing 12 from unintentional activation or exposure to the elements. When in an open position, the flip cover 22 may provide a convenient extension to the radiotelephone 10 and, when fitted with a microphone, may be favorably positioned to receive audio input from a user.

Figure 2:
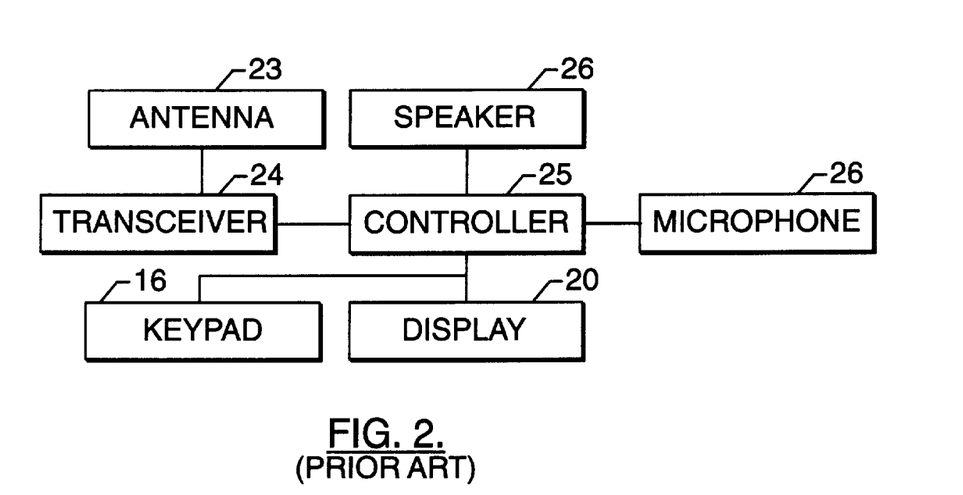
FIG. 2 is a schematic illustration of a conventional arrangement of electronic components for enabling a radiotelephone to transmit and receive telecommunications signals.

A conventional arrangement of electronic components that enable a radiotelephone to transmit and receive telecommunications signals is shown schematically in FIG. 2, and is understood by those skilled in the art of radiotelephone communications. An antenna 23 for receiving and transmitting telecommunication signals is electrically connected to a radio-frequency transceiver 24 that is further electrically connected to a controller 25, such as a microprocessor. The controller 25 is electrically connected to a speaker 26 that transmits a remote signal from the controller 25 to a user of a radiotelephone. The controller 25 is also electrically connected to a microphone 26 that receives a voice signal from a user and transmits the voice signal through the controller 25 and transceiver 24 to a remote device. The controller 25 is electrically connected to a keypad 16 and display 20 that facilitate radiotelephone operation.

Figure 3:
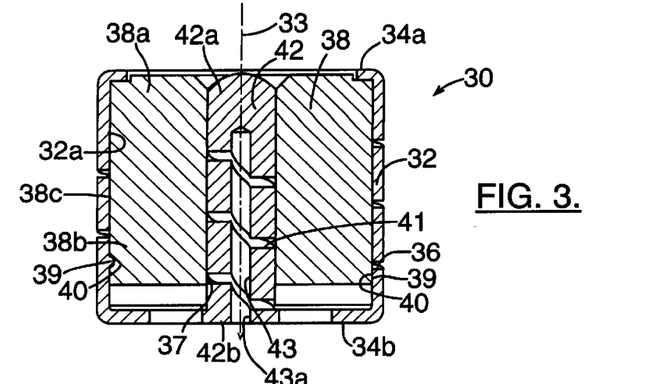
FIG. 3 illustrates a coaxial connector according to an embodiment of the present invention.

Referring now to FIG. 3, a coaxial connector 30, according to an embodiment of the present invention, is illustrated. The illustrated coaxial connector 30 includes a conductive cylindrical sleeve 32 that serves as an outer conductor of the coaxial connector 30 and that extends along an axial direction 33. The sleeve 32 terminates at opposite first and second annular ends 34a, 34b, as illustrated. Preferably, the sleeve first annular end 34a is rounded or "radiused" as illustrated to facilitate insertion within a receptacle, as described below.

Formed within the sleeve 32 is a circumscribing, spiral or helical slot 36, as illustrated. The helical slot 36 allows the first and second annular ends 34a, 34b to be elastically deflected towards each other when a compressive force is applied to the sleeve along the axial direction 33. When the compressive force is removed, the first and second annular ends 34a, 34b move away from each other as the sleeve 32 relaxes to an initial, uncompressed configuration. In effect, the sleeve 32 acts like a spring. Preferably, the sleeve 32 is fabricated from conductive material such as, but not limited to, beryllium-copper and phosphor-bronze.

An electrical insulator 38, having a cylindrical configuration with opposite first and second end portions 38a, 38b, is disposed within the sleeve 32, as illustrated. The electrical insulator 38 has a central bore 37 that extends along the axial direction 33. The electrical insulator 38 is preferably formed from a dielectric, polymeric material, such as Teflon® or Delrin®. The electrical insulator 38 is preferably press-fit into the sleeve 32 or otherwise secured therewithin to restrain movement of the electrical insulator 38 along the axial direction 33.

In the illustrated embodiment of FIG. 3, a ridge 39 is formed circumferentially around the inside surface 32a of the sleeve 32. A channel 40 is formed circumferentially around the outside surface 38c of the electrical insulator 38 and is configured to matingly engage the sleeve ridge 39 to restrain movement of the electrical insulator 38 along the axial direction 33. However, the present invention is not limited to the illustrated embodiment. Other ways of restraining movement of the electrical insulator 38 may be utilized, without limitation.

A conductive pin 42 having opposite first and second ends 42a, 42b, serves as an inner conductor of the coaxial connector 30 and is disposed within the electrical insulator central bore 37, as illustrated. Preferably, the pin first end 42a is radiused, as illustrated, to facilitate insertion within a receptacle, as described below. The pin 42 is configured to slide freely along the axial direction 33 within the central bore 37 of the electrical insulator 38. The electrical insulator 38 electrically insulates the pin 42 from the sleeve 32. The pin first end 42a is substantially coextensive (i.e., flush) with the sleeve first annular end, as illustrated.

The illustrated pin 42 includes an elongated central bore 43 formed therein along the axial direction 33 and that terminates at an aperture 43a in the pin second end 42b. The illustrated pin 42 also includes a circumscribing, helical slot 41 formed therein that allows the first and second ends 42a, 42b thereof to be elastically deflected towards each other when a compressive force is applied to the pin 42 along the axial direction 33. When the compressive force is removed, the first and second ends 42a, 42b move away from each other as the pin 42 relaxes to an initial, uncompressed configuration. In effect, the pin 42 acts like a spring. Preferably, the pin 42 is fabricated from conductive material such as, but not limited to, beryllium-copper and phosphor-bronze.

Figure 4:
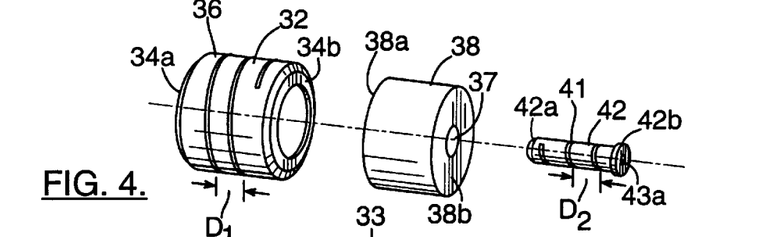
FIG. 4 is an exploded perspective view of the coaxial connector of FIG. 3.

FIG. 4 is an exploded perspective view of the coaxial connector 30 of FIG. 3, illustrating the helical slot 36 formed within the sleeve 32 and the helical slot 41 formed within the pin 42. The amount of axial deflection (i.e., the amount the connector 30 can be compressed along the axial direction 33) that the sleeve 32 and pin 42 are allowed to have is a function of the width and pitch of each respective slot 36, 41. As known to those skilled in this art, the term "pitch" refers to the repetitive distance between adjacent coils of a helical spring. As applied to the present invention, pitch refers to the distance $D_1$ between adjacent slots formed in the sleeve 32 and the distance $D_2$ between adjacent slots formed in the pin 42.

For a slot width of 0.004 inches and pitch of 0.025 inch, the connector 30 can be compressively deflected by about 0.012 inches. A deflection of about 0.012 inches may be sufficient for providing the compliance necessary to rotatably and electrically attach flip covers and the like to radiotelephones. As referred to herein, the term "compliance" refers to the amount of axial force necessary to maintain the coaxial connector 30 in electrical contact with a receptacle while permitting rotation of the coaxial connector 30 within the receptacle.

Figure 7:
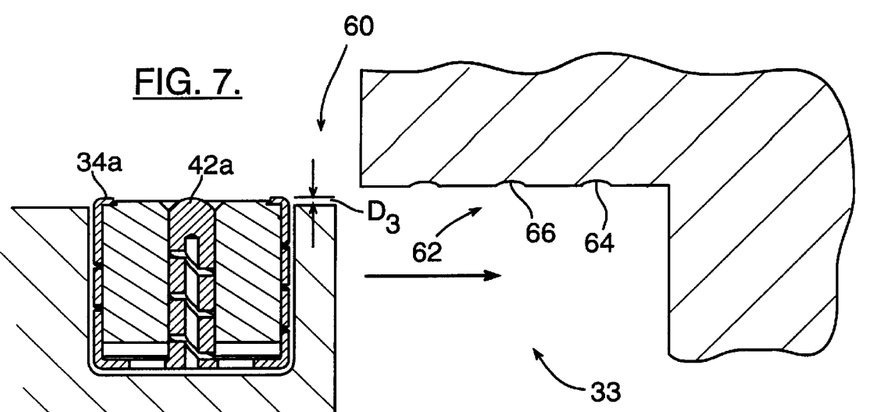
FIG. 7 illustrates the electrical connection apparatus of FIG. 6 in greater detail.

A coaxial connector with the above-described configuration (i.e., slot width of 0.004 inches and pitch of 0.025 inch) incorporated into a radiotelephone flip cover would protrude from the flip cover by a dimension of 0.012 inches (illustrated as $D_3$ in FIG. 7). Accordingly, coaxial connectors according to the present invention can provide adequate compliance while maintaining a low profile.

The present invention is not limited to the above-described configuration (i.e., slot width of 0.004 inches and pitch of 0.025 inch). Slot widths on the order of 0.002 inches are possible utilizing known cutting techniques such as laser cutting. Preferably, slot widths are kept to a minimum for high frequency applications. Small slot widths can help minimize inductance by providing capacitative coupling between adjacent slots in a helical pattern.

Figure 5:
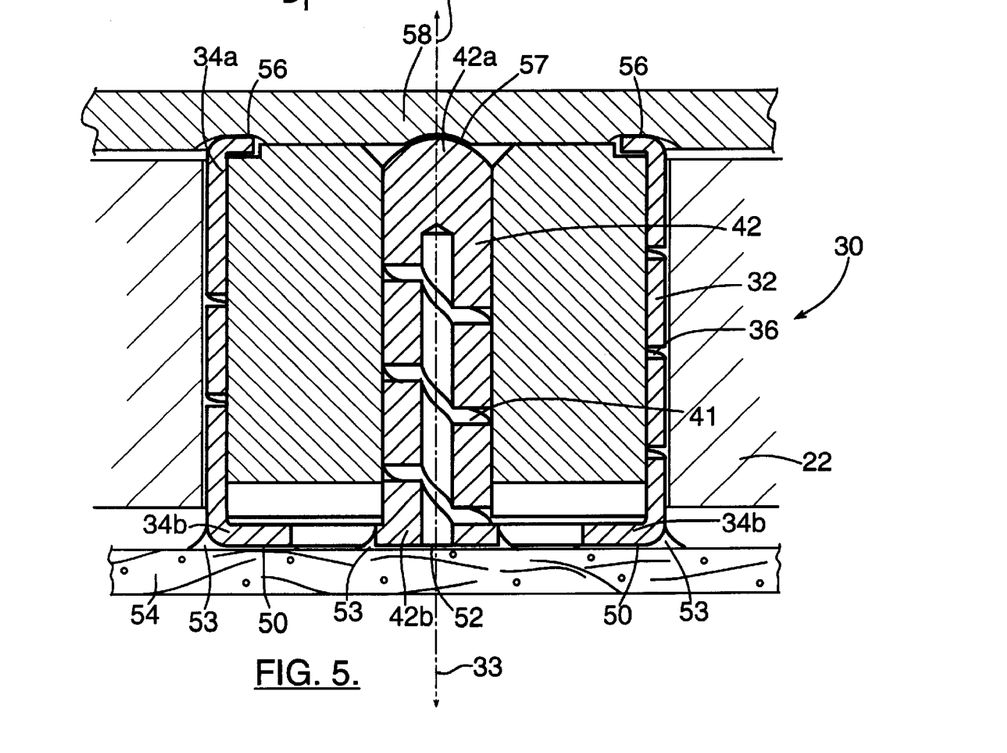
FIG. 5 illustrates the coaxial connector of FIG. 3 in a surface-mounted configuration.

Referring now to FIG. 5, a coaxial connector 30, according to the present invention, is illustrated in a surface-mounted configuration. The sleeve second annular end 34b and the pin second end 42b are secured to respective contacts 50, 52 on a substrate 54, as illustrated. The substrate 54 may be a printed circuit board housed within a flip cover 22 or other portion of a radiotelephone. In the illustrated embodiment, the sleeve second end 34b and the pin second end 42b are secured to the respective contacts 50, 52 via solder 53. However, other ways of securing the sleeve second end 34b and the pin second end 42b to respective contacts 50, 52 may be utilized, as would be known to those skilled in this art. The sleeve first end 34a and the pin first end 42a are matingly engaged within respective contacts 56, 57 disposed within a second substrate 58, as illustrated. The second substrate 58 may be a printed circuit board disposed within a housing of a radiotelephone.

In the illustrated configuration, the sleeve 32 and pin 42 are compressively deflected along the axial direction 33 (i.e., the sleeve first and second annular ends 34a, 34b are deflected towards each other and the pin first and second ends 42a, 42b are deflected towards each other). This compressive axial deflection causes the sleeve 32 and pin 42 to act as springs which exert respective axial forces that are counter to the direction of deflection and which maintain the sleeve and pin first ends 32a, 42a in mating engagement with the respective contacts 56, 57.

Figure 6:
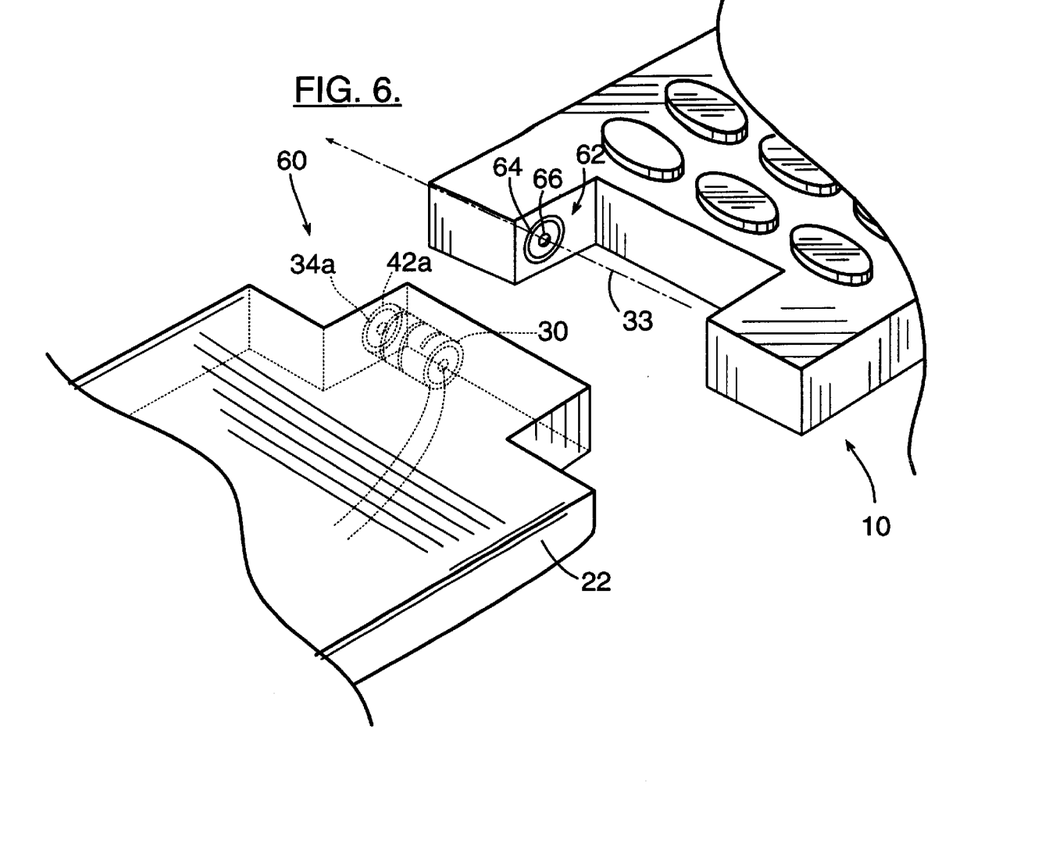
FIG. 6 illustrates an electrical connection apparatus, according to the present invention, including the coaxial connector of FIG. 3 mounted within the flip cover of a radiotelephone and a receptacle mounted within the housing of a radiotelephone for receiving the coaxial connector in mating engagement.

Referring now to FIG. 6, a rotatable electrical connection apparatus 60, according to the present invention, is illustrated. The rotatable electrical connection apparatus 60 includes a coaxial connector 30, as described above, and a receptacle 62 for receiving the coaxial connector 30 in mating engagement therewith. In the illustrated embodiment, the coaxial connector 30 is mounted within a flip cover 22 of a radiotelephone 10.

The illustrated receptacle 62 includes an annular first contact 64 that is configured to receive the sleeve first annular end 34a in mating engagement. The annular first contact 64 allows the coaxial connector 30 to rotate about the axial direction 33 while maintaining mating engagement therebetween. A second contact 66 is configured to receive the pin first end 42a in mating engagement and to allow the coaxial connector 30 to rotate about the axial direction 33.

Referring now to FIG. 7, the rotatable electrical connection apparatus 60 of FIG. 6 is illustrated in greater detail. The annular first contact 64 has a concave configuration that receives the radiused sleeve first end 34a in mating engagement. The second contact 66 also has a concave configuration that receives the radiused pin first end 42a in mating engagement. The force exerted by the sleeve 32 and the pin 42 to counter the deflection caused by inserting the coaxial connector 30 into the receptacle 62 helps maintain the sleeve first annular end 34a and the pin first end 42a in mating engagement with the receptacle first and second contacts 64, 66, respectively.

Figure 8A:
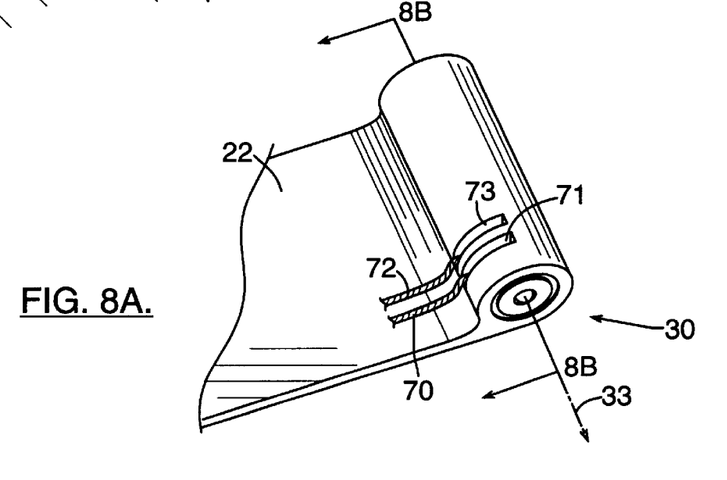
FIGS. 8A–8B illustrate a coaxial connector according to another embodiment of the present invention wherein the pin second end extends outwardly from the sleeve second end.
Figure 8B:
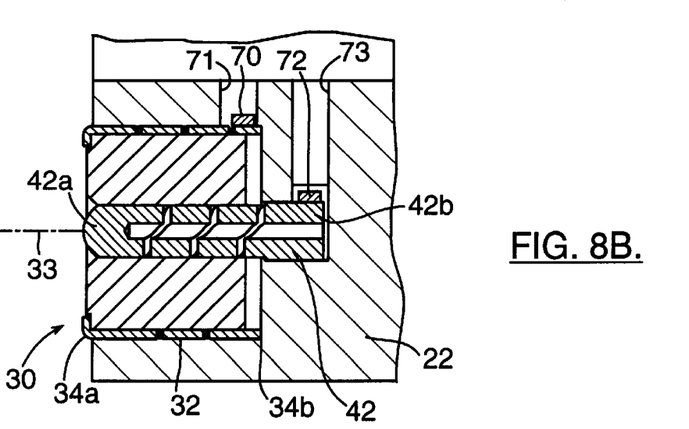

Referring now to FIGS. 8A and 8B, a coaxial connector 30, according to another embodiment of the present invention, is illustrated. The illustrated coaxial connector 30 is housed within a flip cover 22 of a radiotelephone. A first conductor 70 passes through a slot 71 formed in the flip cover 22 and is attached to the coaxial connector sleeve 32, as illustrated. A second conductor 72 passes through a slot 73 formed in the flip cover 22 and is attached to the coaxial connector pin second end 42b. As shown in the sectional view of FIG. 8B, the coaxial connector pin second end 42b extends outwardly from the coaxial connector sleeve second end 34b to facilitate attachment to the second conductor 72.

Figure 9:
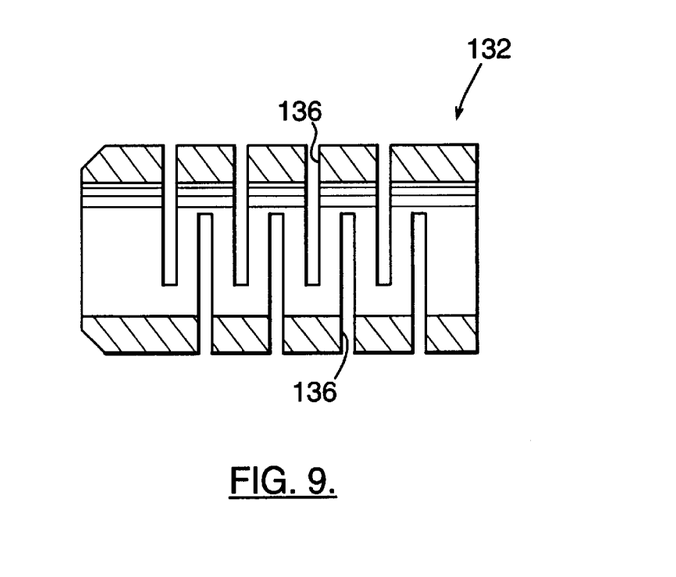
FIG. 9 illustrates a sleeve according to another embodiment of the present invention wherein a series of cross-cut slots are formed therein.

Referring to FIG. 9, a coaxial connector according to the present invention may incorporate a sleeve 132 with a series of overlapping, interdigitated, cross-cut slots 136, as illustrated. Each slot 136 preferably extends beyond the center-line of the sleeve to enable axial deflection as described above. In addition, a conductive pin used with the sleeve 132 as an inner conductor may also have a series of overlapping, interdigitated, cross-cut slots formed therein.

The present invention can facilitate quick and easy separation of electrically connected components. Electrical connectors according to the present invention may be installed in stationary parts of an electronic device, and in parts that rotate with respect to each other.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A coaxial connector, comprising:
   a conductive cylindrical sleeve extending along an axial direction and terminating at opposite first and second annular ends, wherein the sleeve is configured such that the first and second annular ends can be elastically deflected towards each other when a compressive force is applied to the sleeve along the axial direction;
   an electrical insulator disposed within the sleeve and having a central bore extending along the axial direction; and
   a conductive pin disposed within the electrical insulator central bore and electrically insulated from the sleeve, wherein the pin terminates at opposing first and second ends, and is configured such that the first and second ends thereof can be elastically deflected towards each other when a compressive force is applied to the pin along the axial direction.

2. A coaxial connector according to claim 1 wherein the sleeve comprises a circumscribing, helical slot formed therein that allows the first and second annular ends to be elastically deflected towards each other when a compressive force is applied to the sleeve along the axial direction.

3. A coaxial connector according to claim 1 wherein the sleeve comprises a series of overlapping cross-cut slots formed therein that allows the first and second annular ends to be elastically deflected towards each other when a compressive force is applied to the sleeve along the axial direction.

4. A coaxial connector according to claim 1 wherein the pin comprises a circumscribing, helical slot formed therein that allows the first and second ends thereof to be elastically deflected towards each other when a compressive force is applied to the pin along the axial direction.

5. A coaxial connector according to claim 1 wherein the pin comprises a series of overlapping cross-cut slots formed therein that allows the first and second ends thereof to be elastically deflected towards each other when a compressive force is applied to the pin along the axial direction.

6. A coaxial connector according to claim 1 wherein the pin first end is substantially coextensive with the sleeve first annular end.

7. A coaxial connector according to claim 1 wherein the pin has an elongated central bore formed therein along the axial direction that terminates at an aperture in the pin second end.

8. A coaxial connector according to claim 1 wherein the electrical insulator is secured to the sleeve so that movement of the electrical insulator along the axial direction is restrained.

9. A coaxial connector according to claim 1 wherein the sleeve second end is configured to receive a first conductor secured thereto and wherein the pin second end is configured to receive a second conductor secured thereto.

10. A rotatable electrical connection apparatus, comprising:
    a coaxial connector, comprising:
       a conductive cylindrical sleeve extending along an axial direction and terminating at opposite first and second annular ends, wherein the sleeve is configured such that the first and second annular ends can be elastically deflected towards each other when a compressive force is applied to the sleeve along the axial direction;
       an electrical insulator disposed within the sleeve and having a central bore extending along the axial direction;
       a conductive pin disposed within the electrical insulator central bore and electrically insulated from the sleeve, wherein the pin terminates at opposing first and second ends, and is configured such that the first and second ends thereof can be elastically deflected towards each other when a compressive force is applied to the pin along the axial direction; and
    a receptacle configured to receive the coaxial connector, comprising:
       an annular first contact configured to receive the sleeve first annular end in mating engagement and to allow the coaxial connector to rotate about the axial direction while in mating engagement with the sleeve first annular end; and
       a second contact configured to receive the pin first end in mating engagement and to allow the coaxial connector to rotate about the axial direction while in mating engagement with the pin first end.

11. A rotatable electrical connection apparatus according to claim 10 wherein the coaxial connector sleeve comprises a circumscribing, helical slot formed therein that allows the first and second annular ends to be elastically deflected towards each other when a compressive force is applied to the coaxial connector sleeve along the axial direction.

12. A rotatable electrical connection apparatus according to claim 10 wherein the coaxial connector sleeve comprises a series of overlapping cross-cut slots formed therein that allows the first and second annular ends to be elastically deflected towards each other when a compressive force is applied to the coaxial connector sleeve along the axial direction.

13. A rotatable electrical connection apparatus according to claim 10 wherein the coaxial connector pin comprises a circumscribing, helical slot formed therein that allows the first and second ends thereof to be elastically deflected towards each other when a compressive force is applied to the coaxial connector pin along the axial direction.

14. A rotatable electrical connection apparatus according to claim 10 wherein the coaxial connector pin comprises a series of overlapping cross-cut slots formed therein that allows the first and second ends thereof to be elastically deflected towards each other when a compressive force is applied to the coaxial connector pin along the axial direction.

15. A rotatable electrical connection apparatus according to claim 10 wherein the coaxial connector pin first end is substantially coextensive with the coaxial connector sleeve first annular end.

16. A rotatable electrical connection apparatus according to claim 10 wherein the coaxial connector pin has an elongated central bore formed therein along the axial direction that terminates at an aperture in the coaxial connector pin second end.

17. A rotatable electrical connection apparatus according to claim 10 wherein the coaxial connector electrical insulator is secured to the coaxial connector sleeve so that movement of the coaxial connector electrical insulator along the axial direction is restrained.

18. A rotatable electrical connection apparatus according to claim 10 wherein the coaxial connector sleeve second end is configured to receive a first conductor secured thereto and wherein the coaxial connector pin second end is configured to receive a second conductor secured thereto.

19. A rotatable electrical connection apparatus according to claim 10 wherein the receptacle annular first contact is configured to receive a third conductor secured thereto and wherein the receptacle second contact is configured to receive a fourth conductor secured thereto.

20. A radiotelephone comprising:
   a housing configured to enclose electronic components that transmit and receive radiotelephone communications signals;
   a flip cover hinged to the housing and rotatable about an axial direction between a closed position and an open position;
   a coaxial connector mounted within the flip cover, the coaxial connector comprising:
      a conductive cylindrical sleeve extending along the axial direction and terminating at opposite first and second annular ends, wherein the sleeve is configured such that the first and second annular ends can be elastically deflected towards each other when a compressive force is applied to the sleeve along the axial direction;
      an electrical insulator disposed within the sleeve and having a central bore extending along the axial direction;
      a conductive pin disposed within the electrical insulator central bore and electrically insulated from the sleeve, wherein the pin terminates at opposing first and second ends, and is configured such that the first and second ends thereof can be elastically deflected towards each other when a compressive force is applied to the pin along the axial direction;
   a receptacle mounted within the housing and configured to receive the coaxial connector, wherein the receptacle comprises:
      an annular first contact configured to receive the sleeve first annular end in mating engagement and to allow the coaxial connector to rotate about the axial direction while in mating engagement with the sleeve first annular end; and
      a second contact configured to receive the pin first end in mating engagement and to allow the coaxial connector to rotate about the axial direction while in mating engagement with the pin first end.

21. A radiotelephone according to claim 20 wherein the coaxial connector sleeve comprises a circumscribing, helical slot formed therein that allows the first and second annular ends to be elastically deflected towards each other when a compressive force is applied to the coaxial connector sleeve along the axial direction.

22. A radiotelephone according to claim 20 wherein the coaxial connector sleeve comprises a series of overlapping cross-cut slots formed therein that allows the first and second annular ends to be elastically deflected towards each other when a compressive force is applied to the coaxial connector sleeve along the axial direction.

23. A radiotelephone according to claim 20 wherein the coaxial connector pin comprises a circumscribing, helical slot formed therein that allows the first and second ends thereof to be elastically deflected towards each other when a compressive force is applied to the coaxial connector pin along the axial direction.

24. A radiotelephone according to claim 20 wherein the coaxial connector pin comprises a series of overlapping cross-cut slots formed therein that allows the first and second ends thereof to be elastically deflected towards each other when a compressive force is applied to the coaxial connector pin along the axial direction.

25. A radiotelephone according to claim 20 wherein the coaxial connector pin first end is substantially coextensive with the coaxial connector sleeve first annular end.

26. A radiotelephone according to claim 20 wherein the coaxial connector pin has an elongated central bore formed therein along the axial direction that terminates at an aperture in the coaxial connector pin second end.

27. A radiotelephone according to claim 20 wherein the coaxial connector electrical insulator is secured to the coaxial connector sleeve so that movement of the coaxial connector electrical insulator along the axial direction is restrained.

28. A radiotelephone according to claim 20 wherein the coaxial connector sleeve second end is configured to receive a first conductor secured thereto and wherein the coaxial connector pin second end is configured to receive a second conductor secured thereto.

29. A radiotelephone according to claim 20 wherein the receptacle annular first contact is configured to receive a third conductor secured thereto and wherein the receptacle second contact is configured to receive a fourth conductor secured thereto.

30. A radiotelephone comprising:
   a housing configured to enclose electronic components that transmit and receive radiotelephone communications signals;
   a flip cover rotatably mounted to the housing and rotatable about an axial direction between a closed position and an open position; and
   an axially compliant coaxial connector mounted within the flip cover that can deflect axially to allow insertion and removal of the flip cover to and from the housing, respectively.

31. A radiotelephone according to claim 30 wherein the coaxial connector comprises:
   a conductive cylindrical sleeve extending along the axial direction and terminating at opposite first and second annular ends, wherein the sleeve is configured such that the first and second annular ends can be elastically deflected towards each other when a compressive force is applied to the sleeve along the axial direction;
   an electrical insulator disposed within the sleeve and having a central bore extending along the axial direction; and
   a conductive pin disposed within the electrical insulator central bore and electrically insulated from the sleeve, wherein the pin terminates at opposing first and second ends, and is configured such that the first and second ends thereof can be elastically deflected towards each other when a compressive force is applied to the pin along the axial direction.

32. A radiotelephone according to claim 31 further comprising a receptacle mounted within the housing and configured to receive the coaxial connector, wherein the receptacle comprises:
   an annular first contact configured to receive the sleeve first annular end in mating engagement and to allow the coaxial connector to rotate about the axial direction while in mating engagement with the sleeve first annular end; and
   a second contact configured to receive the pin first end in mating engagement and to allow the coaxial connector to rotate about the axial direction while in mating engagement with the pin first end.

33. A radiotelephone according to claim 31 wherein the coaxial connector sleeve comprises a circumscribing, helical slot formed therein that allows the first and second annular ends to be elastically deflected towards each other when a compressive force is applied to the coaxial connector sleeve along the axial direction.

34. A radiotelephone according to claim 31 wherein the coaxial connector sleeve comprises a series of overlapping cross-cut slots formed therein that allows the first and second annular ends to be elastically deflected towards each other when a compressive force is applied to the coaxial connector sleeve along the axial direction.

35. A radiotelephone according to claim 31 wherein the coaxial connector pin comprises a circumscribing, helical slot formed therein that allows the first and second ends thereof to be elastically deflected towards each other when a compressive force is applied to the coaxial connector pin along the axial direction.

36. A radiotelephone according to claim 31 wherein the coaxial connector pin comprises a series of overlapping cross-cut slots formed therein that allows the first and second ends thereof to be elastically deflected towards each other when a compressive force is applied to the coaxial connector pin along the axial direction.

* * * * *

UNITED STATES PATENT AND TRADEMARK OFFICE
CERTIFICATE OF CORRECTION

PATENT NO. : 5,928,000
DATED : July 27, 1999
INVENTOR(S) : Rudisill et al.

It is certified that error appears in the above-identified patent and that said Letters Patent is hereby corrected as shown below:

In the Abstract

In line 7, please delete "appliced" and insert - - applied --.

Signed and Sealed this

Sixteenth Day of May, 2000

*Attest:*

Q. TODD DICKINSON

*Attesting Officer*     *Director of Patents and Trademarks*